United States Patent Office 2,989,400
Patented June 20, 1961

2,989,400
PROCESS FOR MAKING PEANUT CHEDDAR CHEESE
Roman Baumann, Rte. 1, Box 10, Marathon, Wis.
No Drawing. Filed July 1, 1959, Ser. No. 824,220
3 Claims. (Cl. 99—116)

This invention relates to a process for the manufacture of cheese and more particularly to a process for manufacturing American cheddar cheese having an unusually delicious flavor.

An object of the invention is to provide a process for producing American cheddar cheese which has a structure, texture and firmness as other American cheddar cheese, but which has the flavor materially improved by the distribution of peanuts throughout the cheese in a particular part of the process for manufacturing the cheddar cheese.

Although certain types of cheese can and have been used with peanuts, for instance cream cheese with peanuts added substantially or completely after production of the cheese, the process in accordance with this invention integrates the inclusion of peanuts during the process of making the cheese and further, the cheese is American cheddar cheese which has been found to be compatible with the inclusion of peanuts whereas numerous other types of cheese such as brick, Colby, Swiss, etc. does not contain a desired taste due to different ingredients.

It has been found that my process very materially improves the flavor of American cheddar cheese and it has also been found that including peanuts indiscriminately or arbitrarily during the process of cheese manufacture will not achieve precisely the same results as are achieved by a practice of the process of this invention.

Further, different types of cheese are not at all compatible with the introduction of peanuts during manufacture, and attempts to obtain a corresponding flavor improvement in a number of other types of cheese have not proved nearly so successful as the process involving American cheddar cheese. The American cheddar cheese reflects an unusual and unexpected flavor improvement by practice of the method disclosed herein.

Consequently, a further object of the invention is to provide a process for manufacturing American cheddar cheese having a peanut ingredient included during the process and by which the structure, texture, firmness and other qualities of the American cheddar cheese remain unaltered, but the flavor of peanuts is included with the American cheddar cheese and most important, the American cheddar cheese holds its body and is not compromised in any way by the additional flavor of the peanuts.

Other objects will become evident in following the description of a typical process in accordance with the invention. The disclosed process is described in terms of weights, times and procedures in accordance with actual production technique, and it is to be clearly understood that the process is to be interpreted by way of example only in that the proportions, times and other factors will be altered for different batch sizes and in accordance with a few variations in cheese production which are known to the art. A commercial batch size is selected since it is thought to be the best for disclosing my invention to those skilled in this art and who are familiar with such sizes of batch and equipment used in the ordinary process of making American cheddar cheese.

In the production of American cheddar cheese, it is assumed that 1,000 pounds of milk are to be used, after pasteurizing. Accordingly, the milk being weighed is pumped into a pasteurizer, a number of which are commercially available such as what I use, namely, a Kusel Zig-Zag Flo Plate Unit, 10,000 pound capacity. The milk is pasteurized at a temperature not less than 161 degrees Fahrenheit and is held for 20 seconds in the pasteurizer before being cooled to 87 degrees Fahrenheit. It is then pumped into the vat. After 1,000 pounds of milk is in the vats, an ordinary but proper starter is added, for instance, "Marshall No. 9 culture." The starter should not be less than 1%, and at this point the milk is agitated at low speed.

After all of the milk is in the vat, 1¼ ounces of coloring, for instance "Hansens" cheese color to every thousand pounds of milk. Then the milk is agitated at high speed in order to mix the coloring thoroughly with the milk. Thereafter the agitator is stopped and a Marshall rennet test is made to determine the time that it will require until the setting of the milk. After the time is determined and expires, the vat of milk is set with 3¼ oz. of rennet to every thousand pounds of milk. Then after a 15 minute wait, the curd is cut into small cubes, for instance of a size of one-quarter of an inch, and the cutting is made by a standard horizontal and vertical curd knife cutter. After cutting into the small cubes, the curd is started cooking for 45 minutes to a temperature of 101 degrees Fahrenheit, after which the curd is cooked 30 minutes and the whey is drawn off. After there is but very little whey left in the vat to interfere with the operation, the curd is cut into blocks 6 inches wide and 14 inches long. These blocks are turned every 15 minutes. The first time the blocks of curd are turned, the second time the blocks are piled two high for compression, and the third time the blocks are piled three high for further compression, and the fourth time the blocks are again piled three high.

Following this, an acid test is taken to determine if the cheese is matted enough and if so, the acid should be 40 acidity. In the event, after matting the cheese, the acidity is not 40, the blocks are turned again and piled three high and after a 10 minute duration another acid test is made, and by this time the acidity is at the proper stage. Then the blocks of the curd that have been matted are put through a curd mill and cut to small inch and a half cubes. The curd is agitated and washed with water of a temperature of 110 to 115 degrees Fahrenheit. The water is then drawn off the curd.

The next step in the procedure is to salt the curd with 2¾ pounds of salt to every 1,000 pounds of milk. After the salt has been added to the curd there is another 10 minute wait and it is at this time that peanuts are included. In the batch discussed, 18 ounces of shelled salted peanuts are used. These 18 ounces of salted peanuts are used for every 100 pounds of cheese, and they are not merely included without preparation. Four ounces of the peanuts are partially crushed in order to have appearance of the peanuts in the cheese and in order to provide small discrete peanut fragments therein. The other 14 ounces though are ground very fine. The fine grinding of the peanuts is important because this distributes the flavor throughout the cheese. Salted peanuts are mentioned as a preference over unsalted peanuts since the resulting oil tends to encourage the peanuts to adhere better. However, at the expense of this advantage, unsalted peanuts may be used.

When the peanuts are added to the curd, the curd is agitated, remembering now that the curd has the finely ground peanuts therein and they are being interspersed throughout the cheese. Agitation takes place for 7 minutes at a temperature of 75 to 78 degrees Fahrenheit. Following this, the cheese is hooped and put into the press and after an hour it may be dressed or wrapped according to the form of cheese being made, i.e. whether it is 40 pound blocks, horns, cheddars or midgets, etc.

By samplings and tests as well as observation, the resulting cheese has a structure, texture and firmness as any other American cheddar cheese. The difference between the American cheddar cheese of this invention and ordinary American cheddar cheese is found in the flavor. With the peanuts distributed throughout the cheese, the cheese holds its body without attenuation thereof but is accompanied by a delicious flavor of peanuts which is very tasty when eaten with crackers, on a sandwich or as an ordinary piece of cheese as would be consumed by any person choosing to eat American cheddar cheese.

It is understood that certain changes and variations as fall within the scope of the following claims may be resorted to. Accordingly, limitation is sought only in accordance with the following claims.

What is claimed as new is as follows:

1. In the process of manufacturing a peanut containing American cheddar cheese which includes the steps of adding a starter to a batch containing pasteurized milk, adding coloring and agitating to mix the coloring with the milk and starter, setting the milk with rennet and cutting the resulting curd into small pieces after which the small pieces are cooked to a temperature of approximately 101 degrees Fahrenheit, drawing off the whey and cutting the curd into blocks, turning the blocks, again cutting the curd into small pieces and agitating the curd preparatory to adding salt, and salting the curd; the improvement which comprises adding to the salted curd, a mixture consisting of finely ground peanuts and partially crushed peanuts in the ratio of about four parts of partially crushed peanuts for each fourteen parts of ground peanuts, by weight, and agitating the resulting curd containing solid particles of peanuts, preparatory to hooping the same, approximately 18 ounces of the peanut mixture being added to every 100 pounds of cheese.

2. The process of claim 1 wherein the peanuts are shelled salted peanuts.

3. The process of claim 1 wherein the last mentioned agitation is for a period of approximately 7 minutes and at a temperature in the order of 75 to 78 degrees Fahrenheit.

References Cited in the file of this patent

UNITED STATES PATENTS 1,335,383    McColl et al. _____ Mar. 30, 1920

OTHER REFERENCES

"A Simplified Short-Time Method for Making Cheddar Cheese from Pasteurized Milk," United States Department of Agriculture, Agricultural Research Service, May 1956, pp. 1-6.